(12) United States Patent
Qiu et al.

(10) Patent No.: US 11,970,107 B2
(45) Date of Patent: Apr. 30, 2024

(54) DIMMING MECHANISM, VEHICLE LAMP MODULE, VEHICLE LAMP, AND VEHICLE

(71) Applicant: HASCO VISION TECHNOLOGY CO., LTD., Shanghai (CN)

(72) Inventors: Zhiping Qiu, Shanghai (CN); Langrun Jin, Shanghai (CN); Cong Li, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 66 days.

(21) Appl. No.: 17/919,629

(22) PCT Filed: Mar. 17, 2021

(86) PCT No.: PCT/CN2021/081312
§ 371 (c)(1),
(2) Date: Oct. 18, 2022

(87) PCT Pub. No.: WO2021/238352
PCT Pub. Date: Dec. 2, 2021

(65) Prior Publication Data
US 2023/0150419 A1    May 18, 2023

(30) Foreign Application Priority Data

May 26, 2020 (CN) .......................... 202010456521.3
Aug. 26, 2020 (WO) ................. PCT/CN2020/111397

(51) Int. Cl.
*B60Q 1/00* (2006.01)
*B60Q 1/068* (2006.01)
(Continued)

(52) U.S. Cl.
CPC .............. *B60Q 1/14* (2013.01); *B60Q 1/068* (2013.01); *F21S 41/192* (2018.01);
(Continued)

(58) Field of Classification Search
CPC ........ F21S 41/192; F21S 41/657; F21S 45/47; B60Q 1/14; B60Q 1/068
See application file for complete search history.

(56) References Cited

U.S. PATENT DOCUMENTS

2012/0188784 A1* 7/2012 Abe ........................ B60Q 1/076
362/528
2017/0080847 A1* 3/2017 Zhang ..................... F21V 17/10
(Continued)

FOREIGN PATENT DOCUMENTS

| CN | 108302487 A | 7/2018 |
| CN | 208983248 U | 6/2019 |

(Continued)

OTHER PUBLICATIONS

International Search Report, Application No. PCT/CN2020/111397, dated Mar. 3, 2021, 3 pages.
(Continued)

*Primary Examiner* — Gerald J Sufleta, II
(74) *Attorney, Agent, or Firm* — Ziegler IP Law Group

(57) ABSTRACT

A dimming mechanism, which is used for dimming a lighting unit and includes a fixed ball head connecting piece, a first adjustable ball head connecting piece, and a second adjustable ball head connecting piece; one end of the fixed ball head connecting piece is connected to the lighting unit, and the other end is connected to a support frame or lamp body; one end of the first adjustable ball head connecting piece is connected to the lighting unit, and the other end is supported on the support frame or lamp body; and a sliding slot is provided on the lighting unit, and one end of the second adjustable ball head connecting piece (1c) is slidingly connected to the sliding slot so that the sliding slot is, by means of the back and forth motion of the second adjustable ball head connecting piece, driven to rotate, and the lighting unit is, by means of the rotation of the sliding (Continued)

slot, driven to rotate so as to achieve dimming in a second direction. Further disclosed are a vehicle lamp module comprising a dimming mechanism, a vehicle lamp, and a vehicle. The dimming mechanism can achieve the miniaturization of the dimensions of the vehicle lamp module in the second direction, and can improve the precision of dimming in the second direction.

20 Claims, 11 Drawing Sheets

(51) Int. Cl.
| | | |
|---|---|---|
| *B60Q 1/14* | (2006.01) | |
| *F21S 41/19* | (2018.01) | |
| *F21S 41/657* | (2018.01) | |
| *F21S 45/47* | (2018.01) | |
| *F21W 102/00* | (2018.01) | |

(52) U.S. Cl.
CPC .............. *F21S 41/657* (2018.01); *F21S 45/47* (2018.01); *F21W 2102/00* (2018.01)

(56) References Cited

U.S. PATENT DOCUMENTS

| | | | |
|---|---|---|---|
| 2018/0118092 A1* | 5/2018 | Jakobsmeyer | ......... B60Q 1/068 |
| 2019/0017658 A1* | 1/2019 | King | ......... B60Q 3/00 |
| 2019/0092218 A1 | 3/2019 | Kouchi | |
| 2019/0359117 A1* | 11/2019 | Li | ......... F21S 41/39 |
| 2021/0001766 A1* | 1/2021 | Fletcher | ......... F21S 41/151 |
| 2022/0235910 A1* | 7/2022 | Qiu | ......... B60Q 1/076 |

FOREIGN PATENT DOCUMENTS

| | | |
|---|---|---|
| CN | 208997981 U | 6/2019 |
| CN | 110006001 A | 7/2019 |
| CN | 209688728 U | 11/2019 |
| CN | 210050735 U | 2/2020 |
| CN | 210267077 U | 4/2020 |
| CN | 212673117 U | 3/2021 |
| EP | 3425265 A1 | 1/2019 |

OTHER PUBLICATIONS

International Search Report, Application No. PCT/CN2021/081312, dated May 31, 2021, 2 pages.
Written Opinion of the Interanational Searching Authority, Application No. PCT/CN2020/111397, dated Mar. 3, 2021, 3 pages.
Written Opinion of the International Searching Authority, Application No. PCT/CN2021/081312, dated May 31, 2021, 4 pages.

\* cited by examiner

DIMMING MECHANISM, VEHICLE LAMP MODULE, VEHICLE LAMP, AND VEHICLE

CROSS-REFERENCE TO RELATED APPLICATION

The present disclosure claims priority of Chinese patent application with the filing number 202010456521.3 filed on May 26, 2020 and PCT international application with the filing number PCT/CN2020/111397 filed on Aug. 26, 2020, the contents of which are incorporated herein by reference in entirety.

TECHNICAL FIELD

The present disclosure relates to vehicle lamp components, in particular, to a dimming mechanism. In addition, the present disclosure also relates to a vehicle lamp module, a vehicle lamp and a vehicle.

BACKGROUND ART

For a vehicle lamp, especially headlamp, the light shape thereof needs to be calibrated to a standard position by dimming before use or during installation. Therefore, it is necessary to provide a dimming mechanism on the vehicle lamp module so as to adjust the angle, in the up-down or left-right direction, of the projected light shape of the lighting unit relative to the standard position light shape (the light shape is the light shape projected on the standard screen, wherein a low-beam- or high-beam-standard screen for the headlamp is a vertical screen 25 m in front of the vehicle) or the angle between the projected light shapes of lighting units, as shown in FIG. 1 to FIG. 3, wherein P0 is the standard position light shape, P1, P2, P3, and P4 are the position offset light shapes, the light shape shown by P1 needs to be dimmed downward, the light shape shown by P2 needs to be dimmed upward, the light shape shown by P3 needs to be dimmed rightward, and the light shape shown by P4 needs to be dimmed leftward, so as to obtain the light shape P0 located at the standard position.

As shown in FIG. 4 to FIG. 7, the dimming mechanism currently used in the vehicle lamp module includes three ball-head screw assemblies 1, wherein the ball-head screw assembly 1 includes a ball-head screw 101 and a spherical seat nut 102, the shaft part of the ball-head screw 101 is provided with threads, which is connected to the support frame or the lamp body through the threads, the front end of the ball-head screw 101 is provided with a ball head, the ball head matches with a spherical seat nut 102 provided with a ball socket, and the spherical seat nut 102 is fixedly connected with the lighting unit 2. Among the three ball-head screw assemblies 1, one of the ball-head screw assemblies 1 is provided as a ball-head screw assembly 1 that is fixed relative to the support frame or the lamp body, and the other two ball-head screw assemblies 1 are provided as adjustable ball-head screw assemblies 1 that can move back and forth relative to the support frame or lamp body, one of adjustable ball-head screw assemblies 1 is provided below the fixed ball-head screw assembly 1, wherein the ball-head screw 101 of the adjustable ball-head screw assembly 1 is rotated to enable the ball-head screw 101 to move back and forth relative to the support frame or the lamp body, so that the lighting unit 2 rotates, around the horizontal dimming axis, up and down relative to the support frame or the lamp body, so as to realize dimming in the up-down direction; the other adjustable ball-head screw assembly 1 is provided at the left or right side of the fixed ball-head screw assembly 1, wherein the ball-head screw 101 of the adjustable ball-head screw assembly 1 is rotated to move back and forth relative to the support frame or the lamp body, so that the lighting unit 2 rotates, around the vertical dimming axis, left and right relative to the support frame or the lamp body, so as to realize the dimming in the left-right direction. In the above, the horizontal dimming axis is the horizontal axis formed by connecting the ball-head ball center of adjustable ball-head screw assembly 1 located at the left or right side of the fixed ball-head screw assembly 1 and the ball-head ball center of the fixed ball-head screw assembly 1, and the vertical dimming axis is the vertical axis formed by connecting the ball-head ball center of adjustable ball-head screw assembly 1 located below the fixed ball-head screw assembly 1 and the ball-head ball center of the fixed ball-head screw assembly 1.

Although the above-mentioned dimming mechanism can realize dimming in the up-down and left-right directions, it still has at least the following two deficiencies. First, in order to realize the up-down and left-right dimming, the adjustable ball-head screw assembly 1 must be provided on the side of or below the fixed ball-head screw assembly 1, resulting in that the overall dimension a (as shown in FIG. 7) of the dimming mechanism in the up-down or left-right direction is larger, which cannot adapt to the space arrangement requirement of the vehicle lamp module that the up-down dimension or left-right dimension is smaller and smaller; second, if the dimension of the vehicle lamp module in the up-down or left-right direction is smaller, the distance L between the two ball-head screw assemblies 1 in the up-down direction or between the two ball-head screw assemblies 1 in the left-right direction will be shorter, resulting in that the rotating power arm is shorter, and a small amount of back and forth motion of the adjustable ball-head screw assembly 1 will cause the lighting unit 2 to rotate by a larger angle, leading to lower the dimming precision.

SUMMARY

The technical problem to be solved by a first aspect of the present disclosure is to provide a dimming mechanism, wherein the dimming mechanism can realize the miniaturization of the dimension of the vehicle lamp module in a second direction, and can improve the dimming precision in the second direction.

The technical problem to be solved by a second aspect of the present disclosure is to provide a vehicle lamp module, wherein the dimming mechanism of the vehicle lamp module can realize the miniaturization of the dimension of the vehicle lamp module in the second direction, and can improve the dimming precision in the second direction.

The technical problem to be solved by a third aspect of the present disclosure is to provide a vehicle lamp, wherein the dimming mechanism of the vehicle lamp can realize the miniaturization of the dimension of the vehicle lamp module in the second direction, and can improve the dimming precision in the second direction.

The technical problem to be solved by a fourth aspect of the present disclosure is to provide a vehicle, wherein the dimming mechanism of the vehicle can realize the miniaturization of the dimension of the vehicle lamp module in the second direction, and can improve the dimming precision in the second direction.

In order to solve the above-mentioned technical problems, the first aspect of the present disclosure provides a dimming mechanism, which is used for dimming a lighting unit and comprises a fixed ball head connecting piece, a first adjustable ball head connecting piece and a second adjustable ball head connecting piece, wherein one end of the fixed ball head connecting piece is connected to the lighting unit, and the other end is connected to a support frame or a lamp body; one end of the first adjustable ball head connecting piece is connected to the lighting unit, and the other end is supported on the support frame or the lamp body; and a sliding slot is provided on the lighting unit, one end of the second adjustable ball head connecting piece is slidably connected to the sliding slot, and the other end is supported on the support frame or the lamp body, the second adjustable ball head connecting piece can perform a back and forth motion relative to the support frame or the lamp body, so as to drive the sliding slot to rotate, and the light unit is driven, by means of the rotation of the sliding slot, to rotate so as to achieve dimming in the second direction.

As a preferred embodiment of the present disclosure, the fixed ball head connecting piece and the first adjustable ball head connecting piece are both fixedly connected to the support frame or the lamp body.

Optionally, a connecting line between a ball-head ball center of the fixed ball head connecting piece and a ball-head ball center of the first adjustable ball head connecting piece extends in a first direction, and the second adjustable ball head connecting piece is provided behind the fixed ball head connecting piece and the first adjustable ball head connecting piece.

As another preferred embodiment of the present disclosure, the first direction is a left-right direction, and the second direction is an up-down direction; and the ball-head ball center of the fixed ball head connecting piece, the ball-head ball center of the first adjustable ball head connecting piece, and a ball-head ball center of the second adjustable ball head connecting piece are placed in a same horizontal plane.

More preferably, an included angle is formed between the sliding slot and the horizontal plane.

As another preferred embodiment of the present disclosure, the fixed ball head connecting piece and the first adjustable ball head connecting piece are each a ball-head screw assembly, and the ball-head screw assembly comprises a ball-head screw ((i.e., ball stud, ball screw)) and a spherical seat nut (i.e. ball-head nut).

As a specific structural form of the present disclosure, the sliding slot is provided on the lighting unit, a sliding block is provided on the sliding slot, and one end of the second adjustable ball head connecting piece is slidably connected to the sliding slot through the sliding block.

More specifically, the second adjustable ball head connecting piece is a ball-head screw assembly, and the ball-head screw assembly comprises a ball-head screw and a spherical seat nut, the sliding block comprises a sliding block base slidably connected with the sliding slot and a fixed part fixed on the sliding block base, and the fixed part can be movably connected with a ball head of the second adjustable ball head connecting piece; or the sliding block is formed as a sliding rod connected to the spherical seat nut, and the sliding block can be slidably connected in the sliding slot.

Uniquely, the fixed part is formed in a ring-shaped structure, and a clamping slot is formed on the second adjustable ball head connecting piece, a spherical seat nut of the second adjustable ball head connecting piece is clamped on the fixed part through the clamping slot, and the ball-head ball center of the second adjustable ball head connecting piece is provided on an axial centerline of the ring-shaped structure; or the fixed part is formed with a cylindrical surface groove, and the ball head of the second adjustable ball head connecting piece is installed and fitted in the cylindrical surface groove and can slide along the cylindrical surface groove.

As another specific structural form of the present disclosure, an axial centerline of the cylindrical surface groove is perpendicular to a vertical plane passing the ball-head ball center of the fixed ball head connecting piece and the ball-head ball center of the second adjustable ball head connecting piece, wherein an inner surface of the cylindrical surface groove is formed by stretching, along the axial centerline, an intersection line of the ball head of the second adjustable ball head connecting piece and the vertical plane; or the axial centerline of the cylindrical surface groove is formed as an arc line section with a circle center being the ball-head ball center of the fixed ball head connecting piece, and a radius being a connecting line between the ball-head ball center of the fixed ball head connecting piece and the ball-head ball center of the second adjustable ball head connecting piece, wherein the inner surface of the cylindrical surface groove is formed by stretching, along the axial centerline, an intersection line of the ball head of the second adjustable ball head connecting piece and the vertical plane, and the vertical plane is the vertical plane passing the ball-head ball center of the fixed ball head connecting piece and the ball-head ball center of the second adjustable ball head connecting piece.

More specifically, an elastic support structure is provided or integrally formed on an end face of one end of the sliding block base away from the fixed part, and the elastic support structure abuts against a bottom surface of the sliding slot and can form an opposite acting force so that the sliding block base can be tightly attached to the sliding slot and can slide along the sliding slot.

Further, the elastic support structure is embodied as a pair of arc-shaped elastic sheets, and the arc-shaped elastic sheets extend in a direction of the sliding slot.

Furthermore, the second aspect of the present disclosure provides a vehicle lamp module, which comprises the dimming mechanism and the lighting unit according to any one of the above-mentioned technical solutions of the first aspect, wherein the lighting unit comprises a heat sinking part, and the sliding slot is integrally or detachably provided on the heat sinking part.

Further, the third aspect of the present disclosure provides a vehicle lamp, which comprises the vehicle lamp module according to the above-mentioned technical solutions of the second aspect.

Further, the fourth aspect of the present disclosure also provides a vehicle, which comprises the vehicle lamp according to the above-mentioned technical solution of the third aspect.

Through the above-mentioned technical solutions, the dimming mechanism of the present disclosure drives the rotation of the sliding slot and the light unit through the back and forth motion of second adjustable ball head connecting piece to realize dimming in the second direction. For the dimming mechanism, there is no need to provide the second adjustable ball head connecting piece on one side of the fixed ball head connecting piece in the second direction, which can reduce the dimension a' of the lighting unit in the second direction, and realize miniaturization of the lighting unit in the second direction. Moreover, the second adjustable ball head connecting piece is provided behind the fixed ball head connecting piece and the first adjustable ball head connecting piece, which can increase the distance between the ball-head ball center of the second adjustable ball head connecting piece and the second rotating shaft, that is, the power arm of the lighting unit rotating in the second direction increases. Compared with the prior art, in the case that the second adjustable ball head connecting piece moves the same distance, the dimming mechanism provided by the present disclosure can make the amount of rotation of the lighting unit in the second direction smaller, then the precision of the dimming in the second direction is higher. By adjusting the second adjustable ball head connecting piece, the adjustment of the illumination ray in the up-down direction is realized, and the light shape effect is good.

Other advantages of the present disclosure and the technical effects of the preferred embodiments will be further described in the following specific embodiments.

REFERENCE SIGNS IN DRAWINGS

1—ball-head screw assembly; 101—ball-head screw; 102—spherical seat nut;

1a—fixed ball head connecting piece; 1b—first adjustable ball head connecting piece; 1c—second adjustable ball head connecting piece;

2—lighting unit; 201—heat sinking part; 3—support frame or lamp body;

4—sliding slot; 5—lens; 6—sliding block;

601—sliding block base; 6011—sliding part; 6012—elastic support structure;

602—fixed part; 6021—cylindrical surface groove; 6022—axial centerline;

6023—boss; 7—main low beam light shape; 8—auxiliary low beam light shape.

DETAILED DESCRIPTION OF EMBODIMENTS

The specific embodiments of the present disclosure will be described in detail below with reference to the drawings. It should be understood that the specific embodiments described herein are only used to illustrate and explain the present disclosure, and the protection scope of the present disclosure is not limited to the following specific embodiments.

In the description of the present disclosure, it should be noted that, unless otherwise definitely specified and defined, the terms "link" and "connect" should be understood in a broad sense. For example, they can be fixed connection, detachable connection or integrated connection; they can be direct connection or indirect connection by intermediate medium. Connection can be the internal communication between two components or the interaction relationship between two components. For those ordinarily skilled in the art, the specific meaning of the above terms in the present disclosure can be understood according to the specific situation.

Figure 1:
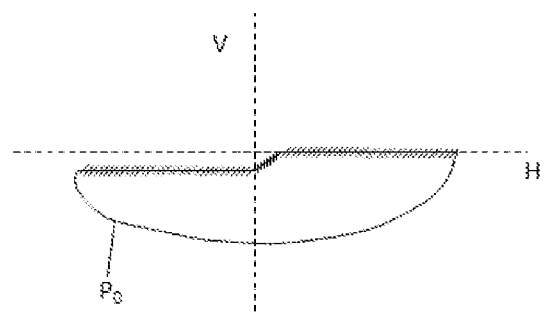
FIG. 1 is a standard light shape view located at a standard position.
Figure 2:
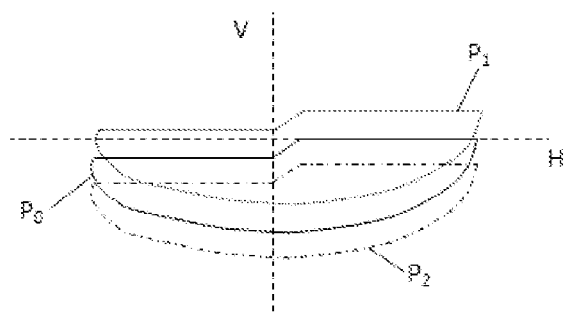
FIG. 2 is an up-down offset light shape view.
Figure 3:
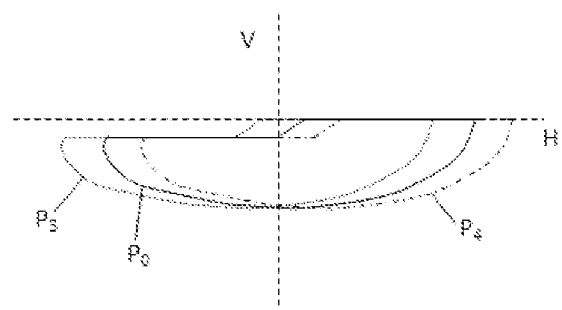
FIG. 3 is a left-right offset light shape view.
Figure 4:
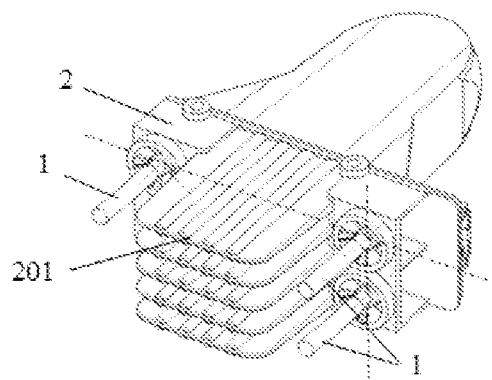
FIG. 4 is a first structural schematic view of a vehicle lamp module in the prior art.
Figure 5:
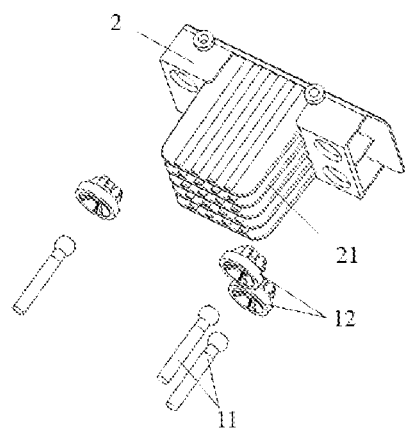
FIG. 5 is an exploded view of FIG. 4.
Figure 6:
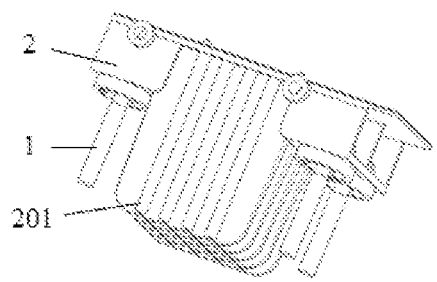
FIG. 6 is a second structural schematic view of the vehicle lamp module in the prior art.
Figure 7:
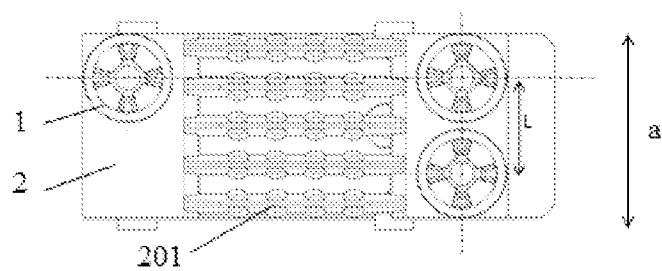
FIG. 7 is a third structural schematic view of the vehicle lamp module in the prior art.
Figure 8:
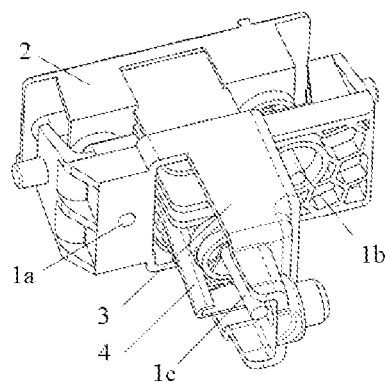
FIG. 8 is a first three-dimensional structural schematic view of a first specific embodiment of a dimming mechanism of the present disclosure, which shows a support frame or a lamp body.

It should be understood that, as shown in FIG. 4, based on the vehicle lamp module, "front" refers to the orientation to which the light exit direction points, "rear" refers to the orientation opposite to "front", "left" refers to the left side of the light exit direction, "right" refers to the right side of the light exit direction, "up" refers to the orientation above in the light exit direction, "down" refers to the orientation below the light exit direction. The terms are based on the direction or positional relationship shown in the drawings, and is only for facilitating describing the present disclosure and simplifying the description, rather than indicating or implying that the referred device or element have to be in the specific orientation, or configured or operated in a specific orientation, therefore, they should not be constructed as limitations on the present disclosure.

Figure 39:
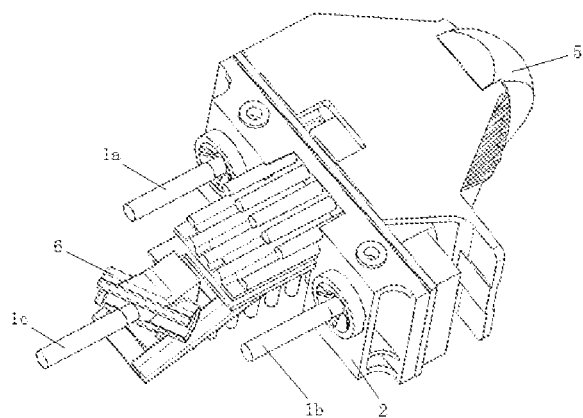
FIG. 39 is a structural schematic view of a vehicle lamp module of the present disclosure.

In addition, it should be noted that the theoretical design state of the dimming mechanism means that the positional relationship between the components of the dimming mechanism of the present disclosure uses, as a reference, a lighting unit that does not require up-down and left-right dimming. For example, for the lighting unit shown in FIG. 39, the positional relationship between the components is designed with the state in which the optical axis of the lens 5 is parallel to the front-rear direction of the vehicle being used as the reference, which includes an included angle between the sliding slot 4 and the horizontal or vertical plane, the geometric relationship between the axial centerline of the cylindrical surface groove 6021 and the ball-head ball centers of the two ball-head screws 101, etc. After the vehicle lamp module is installed on the vehicle lamp, the above-mentioned positional relationship will change during dimming, due to manufacturing tolerances or assembly tolerances and other reasons. Of course, the dimming mechanism is not only applicable to the lighting unit 2 having the lens 5, but also applicable to other lighting units, such as lighting units with reflective optical elements.

In the basic embodiments of the present disclosure, as shown in FIG. 8 to FIG. 18 and FIG. 26 to FIG. 32, a dimming mechanism is provided. The dimming mechanism is used for dimming a lighting unit 2, which comprises a fixed ball head connecting piece 1a, a first adjustable ball head connecting piece 1b and a second adjustable ball head connecting piece 1c, wherein one end of the fixed ball head connecting piece 1a is connected to the lighting unit 2, and the other end is connected to a support frame or a lamp body 3; one end of the first adjustable ball head connecting piece 1b is connected to the lighting unit 2, and the other end is supported on the support frame or the lamp body 3; and a sliding slot 4 is provided on the lighting unit 2, one end of the second adjustable ball head connecting piece 1c is slidably connected to the sliding slot 4, and the other end is supported on the support frame or the lamp body 3, the second adjustable ball head connecting piece 1c can perform a back and forth motion relative to the support frame or the lamp body 3, so as to drive the sliding slot 4 to rotate, and the light unit 2 is driven, by means of the rotation of the sliding slot 4, to rotate so as to achieve dimming in a second direction.

Figure 40:
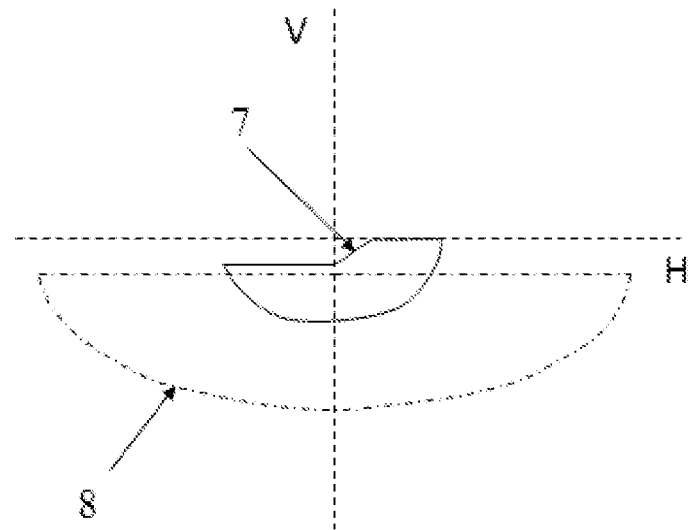
FIG. 40 is a schematic view of a light shape of the vehicle lamp module of the present disclosure before dimming.
Figure 41:
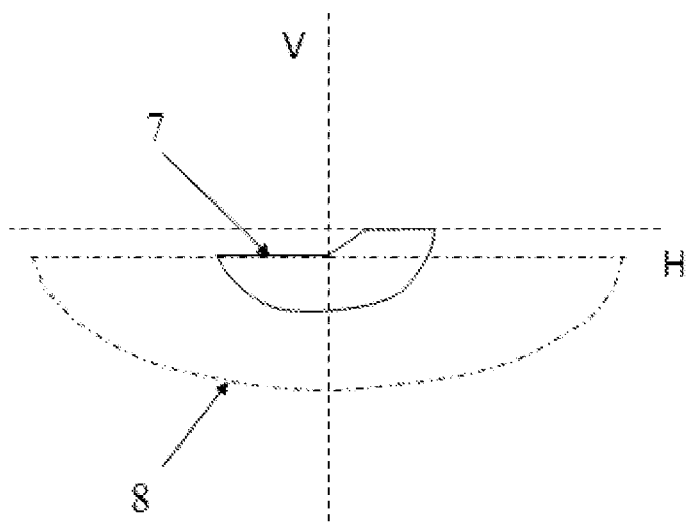
FIG. 41 is a schematic view of the light shape of the vehicle lamp module of the present disclosure after dimming.

The dimming mechanism of the present disclosure can realize dimming in the second direction through the second adjustable ball head connecting piece 1c, and the second direction is preferably the up-down direction. The dimming mechanism of the present disclosure can be applied to the case of dimming of the vehicle lamp module and other modules, of which the light shape has a horizontal upper boundary, wherein since the upper boundary of the light shape is in a horizontal state, dimming is only required in one direction (i.e., up-down direction), and dimming is not required in the other direction (i.e., left-right direction). Specifically, the dimming mechanism of the present disclosure can be applied to auxiliary low beam modules, corner lamp modules or Bending (bend lighting) modules and the like. The specific light shape effects are shown in FIG. 40 and FIG. 41, wherein FIG. 40 shows a main low beam light shape 7 and an auxiliary low beam light shape 8 before adjustment (dimming), wherein the light shape upper boundaries of the main low beam light shape 7 and the auxiliary low beam light shape 8 do not overlap, and the lighting effect is not good, and FIG. 41 shows the main low beam light shape 7 and auxiliary low beam light shape 8 after adjustment (dimming), wherein the upper boundaries of the two light shapes overlap, so that the lighting effect can be better.

It should be noted here that the first direction and the second direction are preferably two directions perpendicular to each other, so that the position of the light shape can be adjusted more accurately. Further explanation is given below by taking the first direction and the second direction perpendicular to each other as an example.

Specifically, the first adjustable ball head connecting piece 1b and the second adjustable ball head connecting piece 1c may be each a ball-head screw assembly 1 or a rod piece with a ball head structure. The fixed ball head connecting piece 1a may be any ball head connecting piece that can realize the fixed connection between the support frame or the lamp body 3 and the lighting unit 2 without affecting the rotation between the fixed ball head connecting piece 1a and the lighting unit 2, or the ball-head screw assembly 1 or the rod piece with the ball head structure that is the same as the first adjustable ball head connecting piece 1b and the second adjustable ball head connecting piece 1c. The ball-head screw assembly 1 includes a ball-head screw 101 and a spherical seat nut 102. The rod piece with the ball head structure is a rod piece without threads replacing the ball-head screw 101 of the ball-head screw assembly 1. When the first adjustable ball head connecting piece 1b and the second adjustable ball head connecting piece 1c are each the ball-head screw assembly 1, two holes suitable for the ball-head screw 101 to pass therethrough are provided on the support frame or the lamp body 3, and internal threads adapted to the external threads of the ball-head screw 101 are provided inside both the two holes. During operation, the ball-head screw 101 is rotated to make the ball-head screw assembly 1 move back and forth, thereby driving the rotation of the lighting unit 2. When the first adjustable ball head connecting piece 1b and the second adjustable ball head connecting piece 1c are the rod pieces each with the ball head structure, two holes suitable for the rod pieces of the first adjustable ball head connecting piece 1b and the second adjustable ball head connecting piece 1c to be inserted therethrough are provided on the support frame or the lamp body 3, and the sizes of the holes are set in a way that the sliding of the first adjustable ball head connecting piece 1b or the second adjustable ball head connecting piece 1c thereinside in the front-rear direction is not affected. During operation, the rod piece of the ball head structure is controlled to slide back and forth, thereby driving the rotation of the lighting unit 2. Of course, the first adjustable ball head connecting piece 1b and the second adjustable ball head connecting piece 1c each can also be a telescopic piece with a ball head structure, that is, the ball-head screw 101 is replaced with a telescopic rod, and the telescopic rod may be fixedly connected with the support frame or lamp body 3, so as to drive the rotation of the lighting unit 2 through the expansion and contraction of the telescopic rod. Preferably, the first adjustable ball head connecting part 1b and the second adjustable ball head connecting part 1c are each the ball-head screw assembly 1, so that slight adjustment can be performed to enable higher precision.

Figure 37:
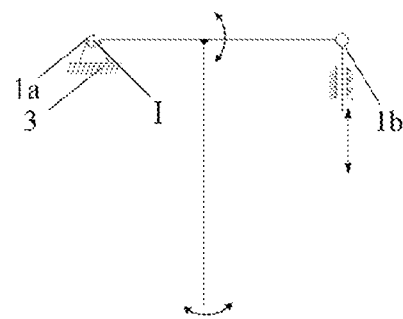
FIG. 37 is a principle schematic view of dimming in a left-right direction of the dimming mechanism of FIG. 8.
Figure 38:
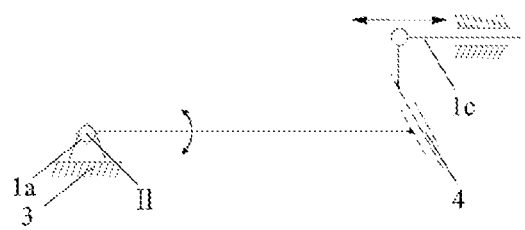
FIG. 38 is a principle schematic view of dimming in an up-down direction of the dimming mechanism of FIG. 8.

When the dimming mechanism provided by the above-mentioned basic embodiment works, it is taken as an example that the fixed ball head connecting piece 1a, the first adjustable ball head connecting piece 1b and the second adjustable ball head connecting piece 1c are each the ball-head screw assembly 1, when dimming is required in the first direction, the ball head of the ball-head screw 101 in the fixed ball head connecting piece 1a and the spherical seat nut 102 matched with it form a rotating pair structure, and the ball head of the ball-head screw 101 in the first adjustable ball head connecting piece 1b and the spherical seat nut 102 matched with it form a rotating pair structure, wherein through the back and forth motion of the first adjustable ball head connecting piece 1b, the lighting unit 2 is enabled to rotate, with the straight line passing the ball-head ball center of the fixed ball head connecting piece 1a and perpendicular to the first direction being as the first rotating shaft I, so as to make the light shape of lighting unit 2 move in the first direction, as shown in FIG. 37. When dimming is required in the second direction, the ball head of the ball-head screw 101 in the fixed ball head connecting piece 1a and the spherical seat nut 102 matched with it form a rotating pair structure, the ball head of the ball-head screw 101 in the first adjustable ball head connecting piece 1b and the spherical seat nut 102 matched with it form a rotating pair structure, and the ball head of the ball-head screw 101 in the second adjustable ball head connecting piece 1c and the spherical seat nut 102 matched with it form a rotating pair structure, wherein through the back and forth motion of the second adjustable ball head connecting piece 1c, the sliding slot 4 is enabled to rotate, with the connecting line between the ball-head ball center of the fixed ball head connecting piece 1a and the ball-head ball center of the first adjustable ball head connecting piece 1b being as the second rotating shaft II, thereby driving the lighting unit 2 to rotate, so as to make the light shape of lighting unit 2 move in the second direction, as shown in FIG. 38.

Specifically, the connecting line between the ball-head ball center of the fixed ball head connecting piece 1a and the ball-head ball center of the first adjustable ball head connecting piece 1b, that is, the above-mentioned second rotating shaft II, extends in the first direction, and the second adjustable ball head connecting piece 1c is provided behind the fixed ball head connecting piece 1a and the first adjustable ball head connecting piece 1b, so as to reduce the dimension a' of the lighting unit 2 in the second direction and increase the distance L' between the ball-head ball center of the second adjustable ball head connecting piece 1c and the second rotating shaft II, so as to realize the miniaturization and the dimming precision of the lighting unit 2 in the second direction.

Figure 12:
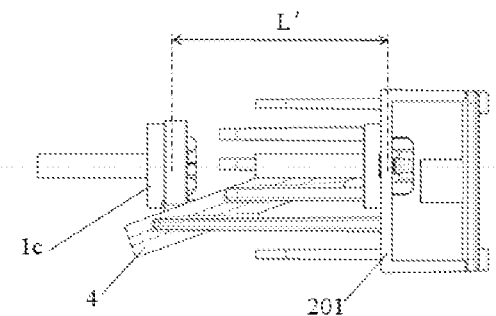
FIG. 12 is a side view of FIG. 9.

The dimming mechanism provided by the above-mentioned basic embodiment drives the lighting unit 2 to rotate, through the back and forth motion of the first adjustable ball head connecting piece 1b, to realize dimming in the first direction, and drives the sliding slot 4 and the lighting unit 2 to rotate, through the back and forth motion of the second adjustable ball head connecting piece 1c, to realize dimming in the second direction. For the dimming mechanism, it is not necessary to provide the second adjustable ball head connecting piece 1c on one side of the fixed ball head connecting piece 1a in the second direction, which can reduce the dimension a' of the lighting unit 2 in the second direction, and realize the miniaturization of the lighting unit 2 in the second direction. Moreover, the second adjustable ball head connecting piece 1c is provided behind the fixed ball head connecting piece 1a and the first adjustable ball head connecting piece 1b, which can increase the distance L' between the ball-head ball center of the second adjustable ball head connecting piece 1c and the second rotating shaft II, that is, the power arm of the lighting unit 2 rotating in the second direction increases, as shown in FIG. 12. Compared with the prior art, in the case where the second adjustable ball head connecting piece 1c moves the same distance, the dimming mechanism provided by the present disclosure enables smaller rotation amount of the lighting unit 2 in the second direction, and higher precision of the dimming in the second direction.

Preferably, both the fixed ball head connecting piece 1a and the first adjustable ball head connecting piece 1b are fixedly connected to the support frame or the lamp body 3, so that the fixed ball head connecting piece 1a and the first adjustable ball head connecting piece 1b will not move back and forth relative to the support frame or the lamp body, enabling that the dimming mechanism of the present disclosure only has the dimming function in the second direction. This solution is suitable for dimming of the vehicle lamp module whose light shape has a horizontal upper boundary, and the first adjustable ball head connecting piece 1b only needs to be fixed on the support frame or the lamp body 3. The structure is simple and the manufacturing cost is lower.

In order to increase the dimming precision in the first direction, in a specific embodiment of the present disclosure, the first adjustable ball head connecting piece 1b is provided on one end of the lighting unit 2 away from the fixed ball head connecting piece 1a. The first adjustable ball head connecting piece 1b is provided on one end of the lighting unit 2 away from the fixed ball head connecting piece 1a, which can increase the power arm of the lighting unit 2 rotating in the first direction during dimming, so that the rotation angle of the lighting unit 2 is smaller when the first adjustable ball head connecting piece 1b moves the same distance, thereby improving the precision of dimming.

In a specific embodiment of the present disclosure, the first direction is the up-down direction, and the second direction is the left-right direction; the ball-head ball center of the fixed ball head connecting piece 1a, the ball-head ball center of the first adjustable ball head connecting piece 1b and the ball-head ball center of the second adjustable ball head connecting piece 1c are placed in the same vertical plane, which can reduce the component generated in the left-right direction during dimming in the up-down direction. This specific embodiment can reduce the dimension of the lighting unit 2 in the left-right direction, and realize the miniaturization of the vehicle lamp module in the left-right direction.

In order to drive the rotation of the sliding slot 4 through the back and forth motion of the second adjustable ball head connecting piece 1c to realize dimming of the lighting unit 2 in the left-right direction, in a specific embodiment of the present disclosure, the included angle formed between the sliding slot 4 and the vertical plane may be 0°-90°, preferably 15°-60°. Specifically, it can be specifically set by those skilled in the art according to actual use and installation conditions. Similarly, the included angle between the sliding slot 4 and the vertical plane also refers to the included angle between the sliding slot 4 and the vertical plane under the theoretical design state. When up-down or left-right dimming is performed, the sliding slot 4 swings, the included angle will also vary.

Figure 11:
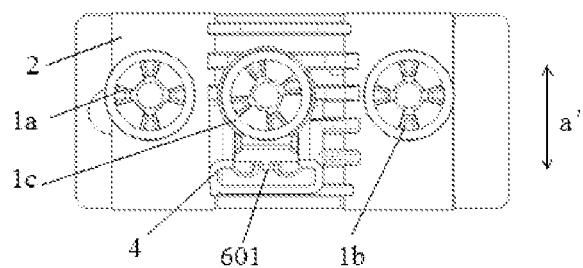
FIG. 11 is a rear view of FIG. 9.

In a specific embodiment of the present disclosure, the first direction is the left-right direction, and the second direction is the up-down direction; as shown in FIG. 11, the ball center of the fixed ball head connecting piece 1a, the ball center of the first adjustable ball head connecting piece 1b and the ball center of the second adjustable ball head connecting piece 1c are placed in the same vertical plane, which can reduce the component generated in the up-down direction during dimming in the left-right direction. This specific embodiment can reduce the dimension of the lighting unit 2 in the up-down direction, and realize the miniaturization of the vehicle lamp module in the up-down direction.

In order to drive the rotation of the sliding slot 4 through the back and forth motion of the second adjustable ball head connecting piece 1c to realize dimming of the lighting unit 2 in the up-down direction, in a specific embodiment of the present disclosure, the included angle formed between the sliding slot 4 and the horizontal plane may be 0°-90°, preferably 15°-60°. Specifically, it can be specifically set by those skilled in the art according to actual use and installation conditions. Similarly, the included angle between the sliding slot 4 and the horizontal plane also refers to the included angle between the sliding slot 4 and the horizontal plane under the theoretical design state. When up-down or left-right dimming is performed, the sliding slot 4 swings, the included angle will also vary.

Figure 13:
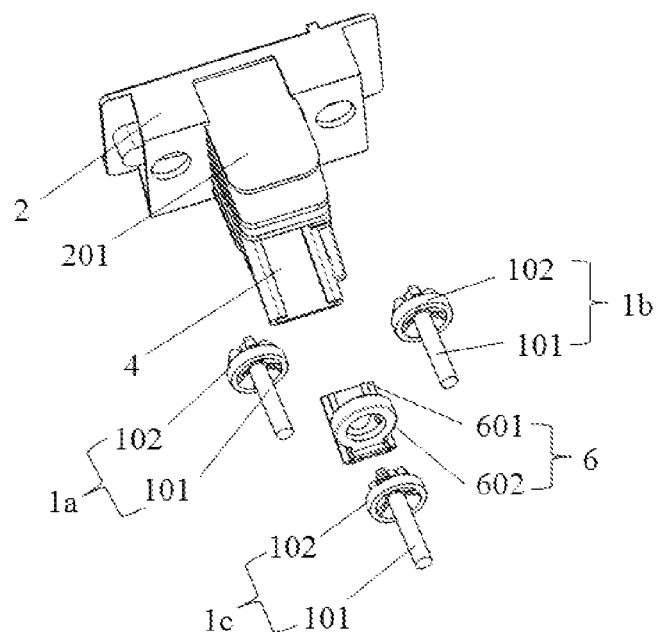
FIG. 13 is an exploded view of FIG. 9.
Figure 17:
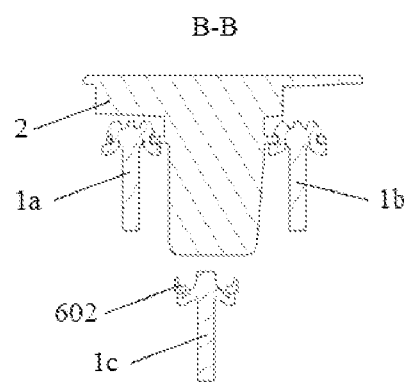
FIG. 17 is a B-B sectional schematic view of FIG. 16.
Figure 18:
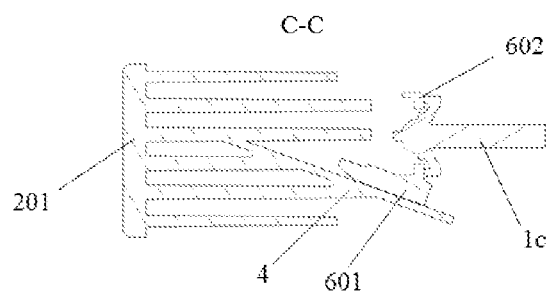
FIG. 18 is a C-C sectional schematic view of FIG. 16.
Figure 19:
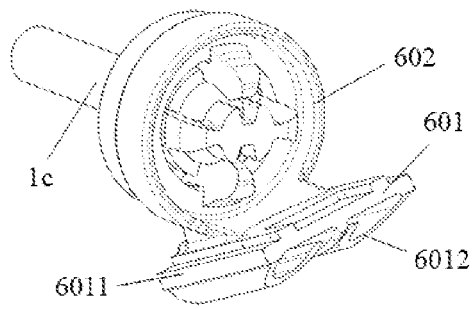
FIG. 19 is a first structural schematic view of a first specific embodiment of a second adjustable ball head connecting piece and a sliding block of the present disclosure.
Figure 20:
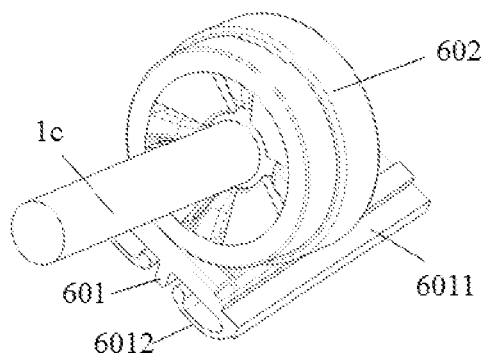
FIG. 20 is a second structural schematic view of the first specific embodiment of the second adjustable ball head connecting piece and the sliding block of the present disclosure.
Figure 21:
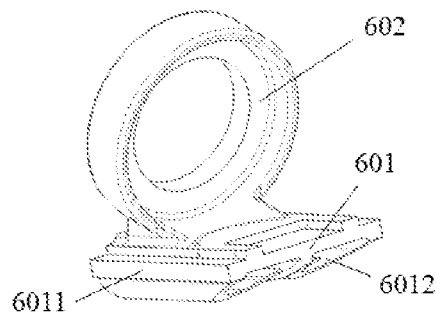
FIG. 21 is a first structural schematic view of a first specific embodiment of the sliding block of the present disclosure.
Figure 22:
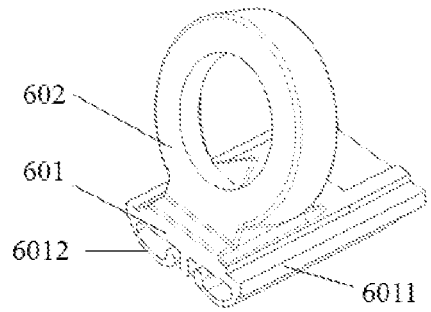
FIG. 22 is a second structural schematic view of the first specific embodiment of the sliding block of the present disclosure.
Figure 23:
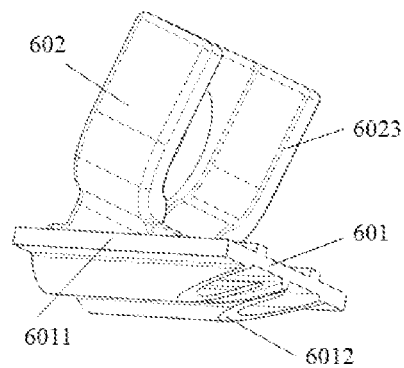
FIG. 23 is a first structural schematic view of a second specific embodiment of the sliding block of the present disclosure.
Figure 24:
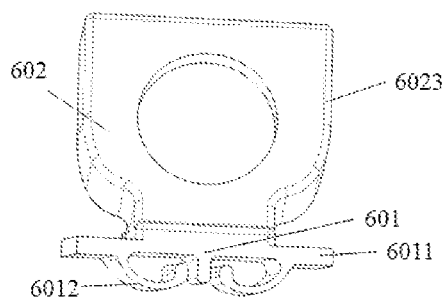
FIG. 24 is a second structural schematic view of the second specific embodiment of the sliding block of the present disclosure.
Figure 25:
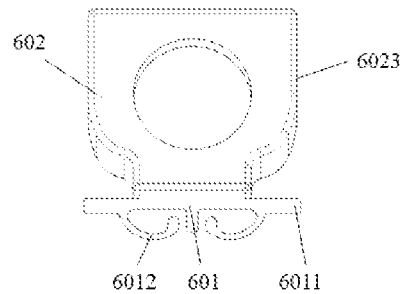
FIG. 25 is a third structural schematic view of the second specific embodiment of the sliding block of the present disclosure.
Figure 26:
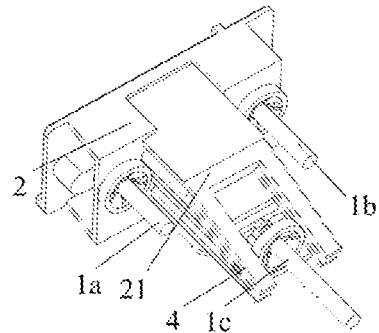
FIG. 26 is a first structural schematic view of a second specific embodiment of the dimming mechanism of the present disclosure.
Figure 27:
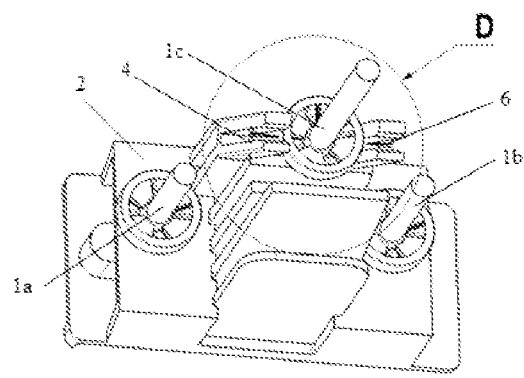
FIG. 27 is a second structural schematic view of the second specific embodiment of the dimming mechanism of the present disclosure.
Figure 28:
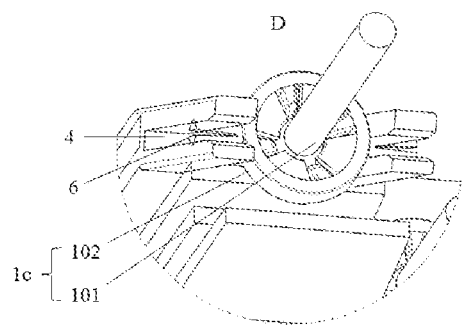
FIG. 28 is an enlarged schematic view of part D in FIG. 27.

In a specific embodiment of the present disclosure, as shown in FIG. 13, FIG. 17 and FIG. 18, the fixed ball head connecting piece 1a, the first adjustable ball head connecting piece 1b and the second adjustable ball head connecting piece 1c are all the ball-head screw assemblies 1, the ball-head screw assembly 1 includes a ball-head screw 101 and a spherical seat nut 102, and a sliding block 6 that can be slidably connected with the sliding slot 4 is provided on the sliding slot 4, and the sliding block 6 includes a sliding block base 601 slidably connected to the sliding slot 4 and a fixed part 602 fixed on the sliding block base 601, and the spherical seat nut 102 of the second adjustable ball head connecting piece 1c is clamped with the fixed part 602. Specifically, the fixed part 602 may be in a ring-shaped structure, the clamping slot is provided on the spherical seat nut 102 of the second adjustable ball head connecting piece 1c, and the spherical seat nut 102 of the second adjustable ball head connecting piece 1c is clamped on the fixed part 602 through the clamping slot, so as to prevent the relative sliding of the second adjustable ball head connecting piece 1c on the fixed part 602. A sliding block base 601 suitable for sliding in the sliding slot 4 is provided on the outer side of the fixed part 602.

Figure 9:
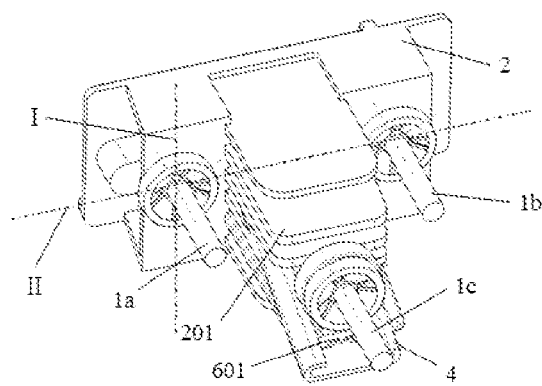
FIG. 9 is a second three-dimensional structural schematic view of the first specific embodiment of the dimming mechanism of the present disclosure.
Figure 10:
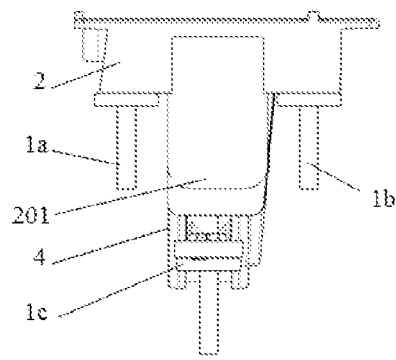
FIG. 10 is a top view of FIG. 9.

During the back and forth motion of the second adjustable ball head connecting piece 1c, the second adjustable ball head connecting piece 1c will drive the fixed part 602 to move, thereby driving the sliding block 6 to move back and forth and slide in the sliding slot 4. Since the sliding slot 4 is provided obliquely with respect to the plane where the ball center of the fixed ball head connecting piece 1a, the ball center of the first adjustable ball head connecting piece 1b, and the ball center of the second adjustable ball head connecting piece 1c are located, the back and forth motion of the sliding block 6 will cause the sliding slot 4 and the lighting unit 2 to rotate, with the connecting line between the ball center of the fixed ball head connecting piece 1a and the ball center of the first adjustable ball head connecting piece 1b being as the second rotating shaft II, thereby realizing dimming in the second direction. For example, when the second direction is the left-right direction, the lighting unit 2 rotates around the second rotating shaft II, so as to realize dimming in the left-right direction; as shown in FIG. 9, when the second direction is the up-down direction, the lighting unit 2 rotates around the second rotating shaft II, so as to realize the dimming in the up-down direction.

Figure 14:
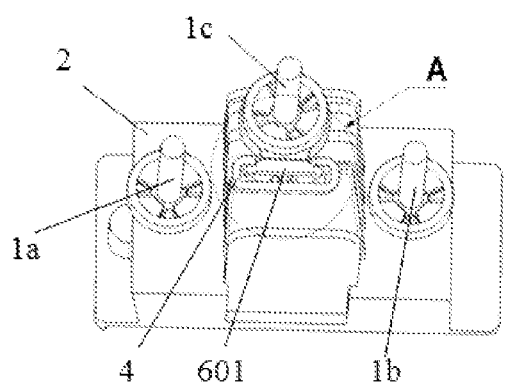
FIG. 14 is a third three-dimensional structural schematic view of the first specific embodiment of the dimming mechanism of the present disclosure.
Figure 15:
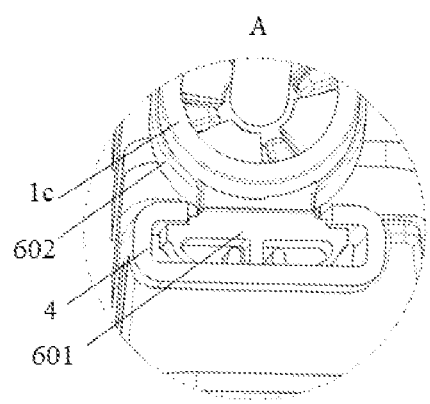
FIG. 15 is an enlarged schematic view of part A in FIG. 14.
Figure 16:
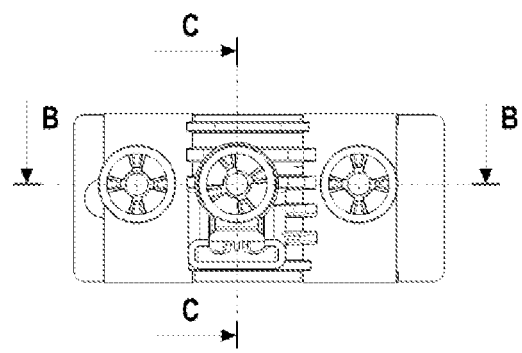
FIG. 16 is a rear view of FIG. 9.

During dimming in the first direction, the first adjustable ball head connecting piece 1b is rotated, the first adjustable ball head connecting piece 1b moves back and forth relative to the support frame or the lamp body 3, so as to drive the lighting unit 2 to rotate in the first direction around the straight line passing the ball center of fixed ball head connecting piece 1a and perpendicular to the first direction, thereby realizing dimming in the first direction. At this time, the lighting unit 2 rotates relative to the support frame or the lamp body 3 in the first direction. Since the sliding slot 4 is integrally provided in the lighting unit 2, the second adjustable ball head connecting piece 1c and the sliding block 6 are fixed relative to the support frame or the lamp body 3, so that the sliding slot 4 rotates relative to the sliding block 6 in the first direction, therefore, there is a gap between the sliding slot 4 and the sliding block 6 in the first direction so that the two can move relatively. For example, as shown in FIG. 14 and FIG. 15, when the first direction is the left-right direction, there are gaps between the sliding slot 4 and the sliding block 6 at both the left and right sides; and for another example, when the first direction is the up-down direction, there are gaps between the sliding slot 4 and the sliding block 6 at both the up and down sides.

In another specific embodiment of the present disclosure, as shown in FIG. 26 to FIG. 30, the fixed ball head connecting piece 1a, the first adjustable ball head connecting piece 1b and the second adjustable ball head connecting piece 1c are all the ball-head screw assemblies 1, wherein the ball-head screw assembly 1 includes a ball-head screw 101 and a spherical seat nut 102, a sliding block 6 is provided on the spherical seat nut 102 of the second adjustable ball head connecting piece 1c, and the sliding block 6 is provided in the sliding slot 4. Preferably, the sliding block 6 is integrally provided in the spherical seat nut 102.

Specifically, the sliding slot 4 here may be a gap formed by two rod-shaped structures and suitable for the sliding block 6 to be clamped thereinto, one end of the sliding block 6 away from the spherical seat nut 102 is provided with an opening, which can make the sliding block 6 have better elasticity, so that the sliding block 6 can be conveniently better inserted into the sliding slot 4 and can be better fixed in the sliding slot 4, and further the relative position of the sliding block 6 and the sliding slot is fixed when the dimming operation is not performed, so as to maintain the stability of the projected light shape of the lighting unit 2.

In the above two specific embodiments, since the sliding slot 4 cooperates with the sliding block 6 in a manner of inclined surfaces contacting each other, when the sliding slot 4 moves relative to the sliding block 6 in the first direction, a motion in the second direction will also occur, that is, the sliding block 6 will slightly moves back and forth relative to the sliding slot 4, so that the lighting unit 2 also has a slight rotation in the second direction. Therefore, during dimming, the dimming in the first direction is preferably performed, and then the dimming in the second direction is performed. This is because, when the dimming in the first direction is performed, the lighting unit 2 also rotates slightly in the second direction. If the dimming in the second direction is performed first, the projected light shape of the lighting unit 2 reaches the standard position in the second direction, and after the dimming in the first direction is performed, it deviates from the standard position due to a slight rotation of the lighting unit 2 in the second direction, which reduces the dimming precision in the second direction. Simultaneously, when dimming in the first direction is performed, stress will be generated between the ball-head screw 101 and the spherical seat nut 102 of the second adjustable ball head connecting piece 1*c*.

Figure 31:
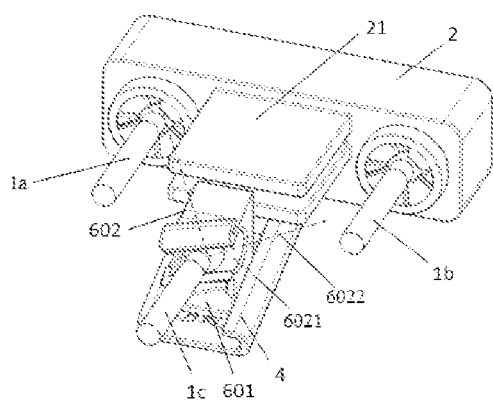
FIG. 31 is a first structural schematic view of a third specific embodiment of the dimming mechanism of the present disclosure.
Figure 32:
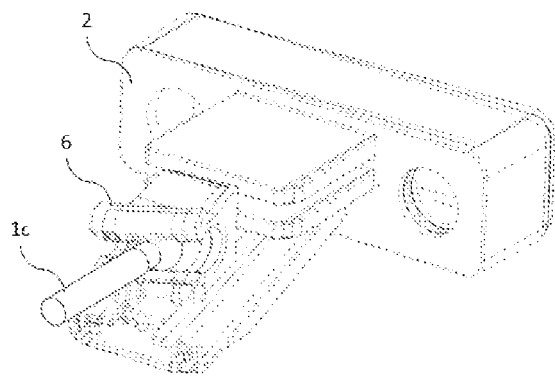
FIG. 32 is a schematic view of a left-right dimming of the dimming mechanism of FIG. 31.
Figure 33:
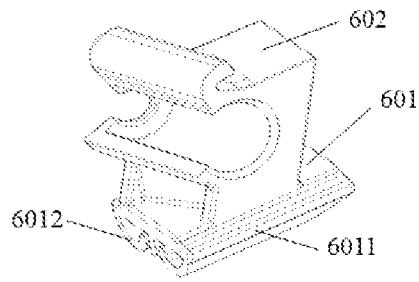
FIG. 33 is a first structural schematic view of a third specific embodiment of the sliding block of the present disclosure.
Figure 34:
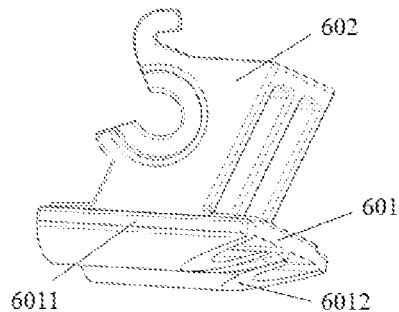
FIG. 34 is a second structural schematic view of the third specific embodiment of the sliding block of the present disclosure.
Figure 35:
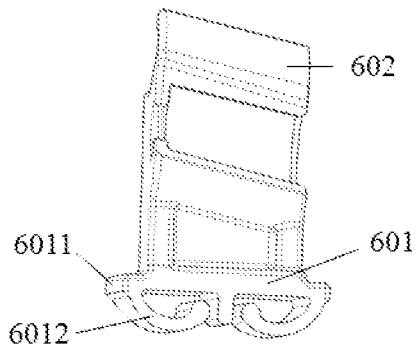
FIG. 35 is a third structural schematic view of the third specific embodiment of the sliding block of the present disclosure.
Figure 36:
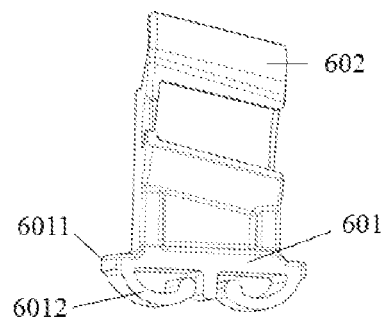
FIG. 36 is a fourth structural schematic view of the third specific embodiment of the sliding block of the present disclosure.

When dimming in the first direction is performed, in order to reduce the slight rotation of the lighting unit 2 in the second direction and the stress between the ball-head screw 101 and the spherical seat nut 102 of the second adjustable ball head connecting piece 1*c*, as another specific embodiment of the present disclosure, as shown in FIG. 31 and FIG. 32, the fixed ball head connecting piece 1*a* and the first adjustable ball head connecting piece 1*b* are each the ball-head screw assembly 1, wherein the ball-head screw assembly 1 includes a ball-head screw 101 and the spherical seat nut 102; the second adjustable ball head connecting piece 1*c* is provided as a ball-head screw 101, a sliding block 6 that can be slidably connected with the sliding slot 4 is provided on the sliding slot 4, and the sliding block 6 includes the sliding block base 601 slidably connected with the sliding slot 4 and the fixed part 602 fixed on the sliding block base 601, a cylindrical surface groove 6021 that can operate with the ball head of the second adjustable ball head connecting piece 1*c* is provided on the fixed part 602, and the ball head of the second adjustable ball head connecting piece 1*c* can slide relatively along the cylindrical surface groove 6021. When dimming in the first direction is performed, the lighting unit 2 rotates relative to the support frame or the lamp body 3 in the first direction. Since the sliding slot 4 is integrally provided on the lighting unit 2, and the ball head of the second adjustable ball head connecting piece 1*c* is slidably connected to the sliding block 6 through the cylindrical surface groove 6021, the second adjustable ball head connecting piece 1*c* is fixed relative to the support frame or the lamp body 3, so that the sliding block 6 can rotate along with the sliding slot 4 in the first direction, while the ball head of the second adjustable ball head connecting piece 1*c* does not move. Therefore, the sliding block 6 does not slightly move back and forth or only extremely slightly move back and forth relative to the sliding slot 4, thereby reducing the slight rotation of the lighting unit 2 in the second direction, and simultaneously, since the second adjustable ball head connecting piece 1*c* is only slidably connected to the sliding block 6 through cooperation between the ball head of the ball-head screw 101 and the cylindrical surface groove 6021, the stress between the components is reduced. Preferably, the ball-head ball center of the second adjustable ball head connecting piece 1*c* is provided on the axial centerline 6022 of the cylindrical surface groove 6021.

During the back and forth motion of the second adjustable ball head connecting piece 1*c*, the second adjustable ball head connecting piece 1*c* will drive the sliding block 6 to move back and forth and slide in the sliding slot 4, in order to make the sliding slot 4 adapt to the sliding of the sliding block 6, since the sliding slot 4 is provided obliquely with respect to the plane where the ball center of the fixed ball head connecting piece 1*a*, the ball center of the first adjustable ball head connecting piece 1*b*, and the ball center of the second adjustable ball head connecting piece 1*c* are located, the back and forth motion of the sliding block 6 will cause the sliding slot 4 and the lighting unit 2 to rotate with the connecting line between the ball center of the fixed ball head connecting piece 1*a* and the ball center of the first adjustable ball head connecting piece 1*b* being as the second rotating shaft II, thereby realizing dimming in the second direction. For example, when the second direction is the left-right direction, the lighting unit 2 rotates around the second rotating shaft II, so as to realize dimming in the left-right direction; and when the second direction is the up-down direction, the lighting unit 2 rotates around the second rotating shaft II, so as to realize the dimming in the up-down direction.

In a relatively preferred embodiment of the present disclosure, the first direction as the left-right direction is taken as an example, as shown in FIG. 8 to FIG. 18, the dimming mechanism includes a fixed ball head connecting piece 1*a*, a first adjustable ball head connecting piece 1*b* and the second adjustable ball head connecting piece 1*c*, wherein the first adjustable ball head connecting piece 1*b* and the fixed ball head connecting piece 1*a* are provided at the left and right two ends of the lighting unit 2, and the connecting line between the ball-head ball centers of the two is a horizontal line; one end of the fixed ball head connecting piece 1*a* is connected with the lighting unit 2, and the other end is connected with the support frame or the lamp body 3; one end of the first adjustable ball head connecting piece 1*b* is connected with the lighting unit 2, and the other end is supported on the support frame or the lamp body 3, the first adjustable ball head connecting piece 1*b* can move back and forth relative to the support frame or the lamp body 3; the sliding slot 4 is provided on the lighting unit 2, and the sliding block 6 that can be slidably connected with the sliding slot 4 is provided on the sliding slot 4, wherein the sliding block 6 comprises the sliding block base 601 slidably connected with the sliding slot 4 and the fixed part 602 fixed on sliding block base 601, one end of the second adjustable ball head connecting piece 1*c* is clamped with the fixed part 602, and there are gaps on both the left and right sides between the sliding block 6 and the sliding slot 4, and the other end of the second adjustable ball head connecting piece 1*c* is supported on the support frame or lamp body 3, the second adjustable ball head connecting piece 1*c* can move back and forth relative to the support frame or lamp body 3, and the ball center of the fixed ball head connecting piece 1*a*, the ball center of the first adjustable ball head connecting piece 1*b* and the ball center of the second adjustable ball head connecting piece 1*c* are placed in the same horizontal plane, and an included angle is formed between the sliding slot 4 and the horizontal plane.

When the dimming mechanism provided by the above preferred embodiment works, the first adjustable ball head connecting piece 1*b*, the second adjustable ball head connecting piece 1*c*, the fixed ball head connecting piece 1*a* and the support frame or the lamp body 3 are connected through threads, and during dimming, the support frame or the lamp body 3 is used as a fixed part. During dimming in the left-right direction, the first adjustable ball head connecting piece 1*b* is rotated, the first adjustable ball head connecting piece 1*b* moves back and forth relative to the support frame or the lamp body 3 to drive the lighting unit 2 to rotate around the first rotating shaft I, thereby achieving dimming in the left-right direction. At this time, the lighting unit 2 rotates left and right relative to the support frame or the lamp body 3. Since the sliding slot 4 is integrally provided in the lighting unit 2, the second adjustable ball head connecting piece 1*c* and the sliding block 6 are fixed relative to the support frame or the lamp body 3, so that the sliding slot 4 rotates left and right relative to the sliding block 6. Therefore, there is a gap between the sliding slot 4 and the sliding block 6 in the left-right direction so that the two can move relative to each other, and simultaneously, since the sliding slot 4 cooperates with the sliding block 6 in a manner of inclined surfaces contacting each other, the sliding slot 4 will perform the left and right motion relative to the sliding block 6, and will also perform the motion in the up-down direction, so that the lighting unit 2 also rotates slightly in the up-down direction. During dimming in the up-down direction, the second adjustable ball head connecting piece 1*c* is rotated, the second adjustable ball head connecting piece 1*c* moves back and forth relative to the support frame or the lamp body 3, and the sliding block 6 moves back and forth in the upwardly inclined sliding slot 4, so that the sliding slot 4 rotates around the second rotating shaft II, thereby driving the lighting unit 2 to rotate around the second rotating shaft II, so as to realize dimming in the up-down direction. The second adjustable ball head connecting piece 1*c* moves forward, the lighting unit 2 rotates upward, and the second adjustable ball head connecting piece 1*c* moves backward, and the lighting unit 2 rotates downward.

In another relatively preferred embodiment of the present disclosure, the first direction as the left-right direction is taken as an example, as shown in FIG. 26 to FIG. 30, the dimming mechanism includes a fixed ball head connecting piece 1*a*, a first adjustable ball head connecting piece 1*b* and the second adjustable ball head connecting piece 1*c*, wherein the first adjustable ball head connecting piece 1*b* and the fixed ball head connecting piece 1*a* are provided at the left and right two ends of the lighting unit 2, and the connecting line between the ball-head ball centers of the two is a horizontal line; one end of the fixed ball head connecting piece 1*a* is connected with the lighting unit 2, and the other end is connected with the support frame or the lamp body 3; one end of the first adjustable ball head connecting piece 1*b* is connected with the lighting unit 2, and the other end is supported on the support frame or the lamp body 3, the first adjustable ball head connecting piece 1*b* can move back and forth relative to the support frame or the lamp body 3; the sliding slot 4 is provided on the lighting unit 2, wherein the fixed ball head connecting piece 1*a*, the first adjustable ball head connecting piece 1*b* and the second adjustable ball head connecting piece 1*c* are all the ball-head screw assemblies 1, wherein the ball-head screw assembly 1 includes a ball-head screw 101 and a spherical seat nut 102, the sliding block 6 is provided on the spherical seat nut 102 of the second adjustable ball head connecting piece 1*c*, the sliding block 6 is provided in the sliding slot 4, and the second adjustable ball head connecting piece 1*c* is supported on the support frame or the lamp body 3, it can move back and forth relative to the support frame or the lamp body 3, and the ball center of the fixed ball head connecting piece 1*a*, the ball center of the first adjustable ball head connecting piece 1*b* and the ball center of the second adjustable ball head connecting piece 1*c* are placed in the same horizontal plane, and an included angle is formed between the sliding slot 4 and the horizontal plane.

In another relatively preferred embodiment of the present disclosure, as shown in FIG. 31 to FIG. 32, the first direction as the left-right direction is taken as an example, the dimming mechanism includes a fixed ball head connecting piece 1*a*, a first adjustable ball head connecting piece 1*b* and the second adjustable ball head connecting piece 1*c*, wherein the first adjustable ball head connecting piece 1*b* and the fixed ball head connecting piece 1*a* are provided at the left and right two ends of the lighting unit 2, and the connecting line between the ball head ball centers of the two is a horizontal line. One end of the fixed ball head connecting piece 1*a* is connected with the lighting unit 2, and the other end is connected with the support frame or the lamp body 3. One end of the first adjustable ball head connecting piece 1*b* is connected with the lighting unit 2, and the other end is supported on the support frame or the lamp body 3. The first adjustable ball head connecting piece 1*b* can move back and forth relative to the support frame or the lamp body 3. the fixed ball head connecting piece 1*a* and the first adjustable ball head connecting piece 1*b* are each the ball-head screw assembly 1, wherein the ball-head screw assembly 1 includes a ball-head screw 101 and a spherical seat nut 102. The second adjustable ball head connecting piece 1*c* only includes the ball-head screw 101. The sliding slot 4 is provided on the lighting unit 2. The sliding block 6 that can be slidably connected to the sliding slot 4 is provided on the sliding slot 4. The sliding block 6 includes a sliding block base 601 slidably connected to the sliding slot 4 and a fixed part 602 fixed on the sliding block base 601. The cylindrical surface groove 6021 that can cooperate with the ball head of the second adjustable ball head connecting piece 1*c* is provided on fixed part 602, and the ball head of the second adjustable ball head connecting piece 1*c* can slide relatively along the cylindrical surface groove 6021. The second adjustable ball head connecting piece 1*c* is supported on the support frame or the lamp body 3, and it can move back and forth relative to the support frame or the lamp body 3. The ball center of the fixed ball head connecting piece 1*a*, the ball center of the first adjustable ball head connecting piece 1*b* and the ball center of the second adjustable ball head connecting piece 1*c* are placed in the same horizontal plane, and an included angle is formed between the sliding slot 4 and the horizontal plane. During dimming in the left-right direction, the first adjustable ball head connecting piece 1*b* is rotated, and the first adjustable ball head connecting piece 1*b* moves back and forth relative to the support frame or the lamp body 3 to drive the lighting unit 2 to rotate around the first rotating shaft I. At this time, the lighting unit 2 rotates left and right relative to the support frame or the lamp body 3 to realize dimming in the left-right direction. During dimming in the up-down direction, the second adjustable ball head connecting piece 1*c* is rotated, the second adjustable ball head connecting piece 1*c* moves back and forth relative to the support frame or the lamp body 3, and the sliding block 6 moves back and forth in the upwardly inclined sliding slot 4, so that the sliding slot 4 rotates around the second rotating shaft II, thereby driving the lighting unit 2 to rotate around the second rotating shaft II, so as to realize dimming in the up-down direction. The second adjustable ball head connecting piece 1*c* moves forward, the lighting unit 2 rotates upward, the second adjustable ball head connecting piece 1c moves backward, and the lighting unit 2 rotates downward.

The dimming mechanism provided by the above three preferred embodiments drives, through the back and forth motion of the first adjustable ball head connecting piece 1b, the lighting unit 2 to rotate to realize dimming in the left-right direction, and drives, though the back and forth motion of the second adjustable ball head connecting piece 1c, the sliding slot 4 to rotate up and down, so that the light unit 2 rotates up and down to achieve dimming in the up-down direction. For the dimming mechanism, there is no need to provide the second adjustable ball head connecting piece 1c on one side of the fixed ball head connecting piece 1a in the up-down direction, which can reduce the dimension a' of the lighting unit 2 in the up-down direction, and realize the miniaturization of vehicle lamp module in the up-down direction. Moreover, the second adjustable ball head connecting piece 1c is provided directly behind the fixed ball head connecting piece 1a and the first adjustable ball head connecting piece 1b, which can increase the distance L' between the ball-head ball center of the second adjustable ball head connecting piece 1c and the second rotating shaft II, that is, the power arm of the lighting unit 2 rotating in the up-down direction is increased, as shown in FIG. 12. Compared with the prior art, in the case that the second adjustable ball head connecting piece 1c moves the same distance, and the dimming mechanism provided by the present disclosure will make the amount of rotation of the lighting unit 2 in the up-down direction smaller, thereby making the dimming precision in the up-down direction higher. Simultaneously, the first adjustable ball head connecting piece 1b is provided on one side away from the fixed ball head connecting piece 1a, which can increase the distance between the ball-head ball center of the first adjustable ball head connecting piece 1b and the first rotating shaft I, and increase the power arm of light unit 2 rotating in the left-right direction, so as to improve the dimming precision in the left-right direction.

As a specific structural form of the present disclosure, a sliding slot 4 is provided on the lighting unit 2, and one end of the second adjustable ball head connecting piece 1c is slidably connected to the sliding slot 4 through the sliding slot 6.

Specifically, as shown in FIG. 19 to FIG. 25 and FIG. 33 to FIG. 36, the sliding block 6 includes a sliding block base 601 slidably connected with the sliding slot 4 and a fixed part 602 fixed on the sliding block base 601. The two sides of the sliding block base 601 are provided with sliding parts 6011, wherein the siding block base 601 is slidably connected with the sliding slot 4 through the sliding part 6011, so that the sliding block 6 can slide along the sliding slot 4. Here, the sliding slot 4 has a guiding function, and the sliding parts 6011 at two sides of the sliding block 6 are inserted into the sliding slot 4 to guide the sliding block 6 to slide in the direction of the sliding slot 4. The sliding block 6 shown in FIG. 19 to FIG. 25 and FIG. 33 to FIG. 36 has a fixed part 602 in two structural forms, and the fixed part 602 can be movably connected with the ball head of the second adjustable ball head connecting piece 1c. In the first structural form, the fixed part 602 is formed in a ring-shaped structure, and the second adjustable ball head connecting piece 1c includes a ball-head screw 101 and a spherical seat nut 102, a clamping slot is formed on the spherical seat nut 102, and the clamping slot can be clamped into the ring-shaped structure, so that the fixed part 602 is clamped with the second adjustable ball head connecting piece 1c. The ball-head ball center of the second adjustable ball head connecting piece 1c is provided on the axial centerline 6022 of the ring-shaped structure, and the fixed part 602 is formed in a round ring shape. The spherical seat nut 102 of the second adjustable ball head connecting piece 1c is formed with a clamping slot, and the clamping slot can be clamped into the round-ring-shaped fixed part 602 to realize the fixed connection between the second adjustable ball head connecting piece 1c and the fixed part 602. A round-ring-shaped member (with the rectangular section) may be formed around the fixed part 602, which can not only limit the clamping claw, on the spherical seat nut 102, for forming the clamping slot, but also protect the clamping slot. In addition, the fixed part 602 is formed in a round ring shape, but two sides of the fixed part 602 are provided with bosses 6023, the bosses 6023 extend in the axial direction of the fixed part 602, and the upper parts of the bosses 6023 on both sides are each formed in an opening structure. The fixed parts 602 in the above-mentioned two structures are selected according to actual installation needs. In the second structural form, the fixed part 602 is formed with a cylindrical surface groove 6021, the second adjustable ball head connecting piece 1c is provided as a ball-head screw 101, and the ball head of the second adjustable ball head connecting piece 1c is installed and fitted in the cylindrical surface groove 6021 and can slide along the cylindrical surface groove 6021. It should be noted here that, in the theoretical design state of the dimming mechanism, the ball-head ball center of the second adjustable ball head connecting piece 1c is located on the vertical center plane of the sliding block 6. Both the sliding block 6 and the sliding slot 4 coincide with the vertical center plane of the lighting unit 2. The axial centerline 6022 of the cylindrical surface groove 6021 is perpendicular to the vertical plane passing the ball-head ball center of the fixed ball head connecting piece 1a and the ball-head ball center of the second adjustable ball head connecting piece 1c, wherein the inner surface of the cylindrical surface groove 6021 is formed by stretching, along the axial centerline 6022, the intersection line of the ball head of the second adjustable ball head connecting piece 1c and the vertical plane. At this time, during left-right dimming, since the sliding block 6 rotates along the trajectory of the arc line section formed with the ball-head ball center of the fixed ball head connecting piece 1a being as a circle center, and a connecting line between the ball-head ball center of the fixed ball head connecting piece 1a and the ball-head ball center of the second adjustable ball head connecting piece 1c being as a radius, while the axial centerline 6022 is a straight line, the ball head of the second adjustable ball head connecting piece 1c can only slide along the straight line relative to the cylindrical surface groove 6021, so that there is still a certain stress between the ball head of the second adjustable ball head connecting piece 1c and the cylindrical surface groove 6021; or the axial centerline 6022 of the cylindrical surface groove 6021 is formed as an arc line section with the ball-head ball center of the fixed ball head connecting piece 1a being as a circle center, and a connecting line between the ball-head ball center of the fixed ball head connecting piece 1a and the ball-head ball center of the second adjustable ball head connecting piece 1c being as a radius, wherein the inner surface of the cylindrical surface groove 6021 is formed by stretching, along the axial centerline 6022, the intersection line of the ball head of the second adjustable ball head connecting piece 1c and the vertical plane, and the vertical plane is the vertical plane passing the ball-head ball center of the fixed ball head connecting piece 1a and the ball-head ball center of the second adjustable ball head connecting piece 1c. At this time, during left-right dimming, the sliding block 6 rotates along the trajectory of the above-mentioned arc line section, and the relative sliding between the ball head of the second adjustable ball head connecting piece 1*c* and the cylindrical surface groove 6021 is also along the above-mentioned arc line section, so that there is basically no stress between the ball head of the second adjustable ball head connecting piece 1*c* and the cylindrical surface groove 6021, which is beneficial to prolonging the service life of the parts. However, considering the manufacturing cost of the parts and other reasons, preferably, the axial centerline 6022 is the cylindrical surface groove 6021 of straight line. The cylindrical surface groove 6021 is closely matched (cooperates) with the ball head of the second adjustable ball head connecting piece 1*c*, which can not only ensure that the ball head of the second adjustable ball head connecting piece 1*c* rotates in the cylindrical surface groove 6021, but also ensure sliding thereof in the cylindrical surface groove 6021.

In addition, it can also be seen from the figure that an included angle is formed between the plane of the fixed part 602 and the upper or lower plane of the sliding part 6011, with the plane of the fixed part attached to and abutting against the clamping slot of the second adjustable ball head connecting piece 1*c*, wherein the sum of the included angle and the included angle between the above-mentioned sliding slot 4 and the horizontal plane is 90°. It can also be understood that an included angle is formed between the fixed part 602 and the sliding block base 601, wherein the sum of the included angle and the included angle between the above-mentioned sliding slot 4 and the horizontal plane is 90°, so as to ensure that the second adjustable ball head connecting piece 1*c* extends horizontally.

Figure 29:
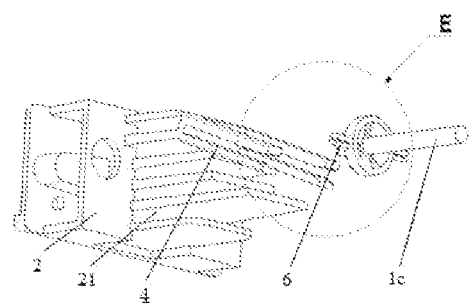
FIG. 29 is a third structural schematic view of the second specific embodiment of the dimming mechanism of the present disclosure.
Figure 30:
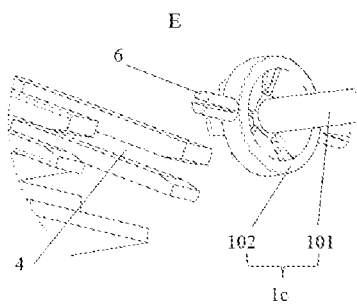
FIG. 30 is an enlarged schematic view of part E in FIG. 29.

Optionally, as shown in FIG. 29 and FIG. 30, the sliding block 6 is formed as a sliding rod connected to the spherical seat nut 102, and the sliding block 6 can be slidably connected in the sliding slot 4. Therefore, in addition to the structures shown in FIG. 19 to FIG. 25 and FIG. 33 to FIG. 36, the sliding slot 4 may also be in the structural form shown in FIG. 29 and FIG. 30. At this time, the sliding block 6 slides in the sliding slot 4 and can also guide the second adjustable ball head connecting piece 1*c* to slide along the sliding slot 4. Of course, the operating structure of the sliding block 6 and the sliding slot 4 may also be in other structural forms, the purpose of which is to enable the sliding block 6 to slide along the sliding slot 4, so as to enable the second adjustable ball head connecting piece 1*c* to move back and forth in the direction of the sliding slot 4, which all belong to the protection scope of the present disclosure.

As another specific structural form of the present disclosure, as shown in FIG. 19 to FIG. 25 and FIG. 33 to FIG. 36, an elastic support structure 6012 is provided or integrally formed on an end face of one end of the sliding block base 601 away from the fixed part 602, wherein the elastic support structure 6012 abuts against the bottom surface of the sliding slot 4 and can form an opposite acting force so that the sliding block base 601 can be tightly attached to the sliding slot 4 and can slide along the sliding slot 4.

Specifically, the elastic support structure 6012 is a pair of arc-shaped elastic sheets, and the arc-shaped elastic sheets extend in the direction of the sliding slot 4.

More specifically, one side edge of the elastic support structure 6012 is connected with the lower part edge of the sliding block base 601. It can be understood that one side of the elastic support structure 6012 is connected to the lower part edge of the sliding block base 601, and a gap is formed between the other side and the lower surface of the sliding block base 601, and simultaneously, the elastic support structure 6012 is in a decurved curved surface structure. When the sliding part 6011 is inserted into the sliding slot 4, the elastic acting force of the elastic support structure 6012 makes the sliding part 6011 tightly attached to the sliding slot 4 without affecting the sliding of the sliding part 6011 in the sliding slot 4. It should be noted here that the "upper" and "lower" referred to here are only the current positions shown by the parts in FIG. 21 to FIG. 25 and FIG. 33 to FIG. 36, and cannot represent the position indicated after the parts are actually installed.

In addition, an embodiment of the present disclosure also provides a vehicle lamp module, wherein the vehicle lamp module includes the dimming mechanism and the lighting unit 2 of the above-mentioned embodiments. In order to effectively utilize the internal space of the vehicle lamp module, the lighting unit 2 includes a heat sinking part 201, and the sliding slot 4 is integrally or detachably provided on the heat sinking part 201. The integrated connection is preferred, which can reduce installation steps and reduce installation difficulty.

Furthermore, embodiments of the present disclosure provide a vehicle lamp, which includes the vehicle lamp module of the above-mentioned embodiments.

Embodiments of the present disclosure also provide a vehicle, wherein the vehicle includes the vehicle lamp of the above-mentioned embodiments.

The preferred embodiments of the present disclosure have been described in detail above with reference to the drawings. However, the present disclosure is not limited to the specific details in the above-mentioned embodiments. Within the scope of the technical concept of the present disclosure, various simple variations can be made to the technical solutions of the present disclosure, and these simple variations all belong to the protection scope of the present disclosure.

Furthermore, it should be noted that the specific technical features described in the above-mentioned specific embodiments can be combined in any suitable manner without conflict, in order to avoid unnecessary repetition, the present disclosure will not describe the various possible combinations.

In addition, the various embodiments of the present disclosure can also be combined arbitrarily, as long as they do not violate the idea of the present disclosure, they should also be regarded as the contents disclosed in the present disclosure.

What is claimed is:

1. A dimming mechanism, configured to dim a lighting unit, comprising a fixed ball head connecting piece, a first adjustable ball head connecting piece and a second adjustable ball head connecting piece, wherein the fixed ball head connecting piece has one end connected to the lighting unit, and the other end connected to a support frame or a lamp body;

the first adjustable ball head connecting piece has one end connected to the lighting unit, and the other end supported on the support frame or the lamp body; and a sliding slot is provided on the lighting unit, the second adjustable ball head connecting piece has one end slidably connected to the sliding slot, and the other end supported on the support frame or the lamp body, the second adjustable ball head connecting piece is configured to be movable back and forth relative to the support frame or the lamp body, so as to drive the sliding slot to rotate, and drive, through the rotation of the sliding slot, the light unit to rotate so as to achieve dimming in a second direction.

2. The dimming mechanism according to claim 1, wherein the fixed ball head connecting piece and the first adjustable ball head connecting piece are both fixedly connected to the support frame or the lamp body.

3. The dimming mechanism according to claim 2, wherein a connecting line between a ball-head ball center of the fixed ball head connecting piece and a ball-head ball center of the first adjustable ball head connecting piece extends in a first direction, and the second adjustable ball head connecting piece is provided behind the fixed ball head connecting piece and the first adjustable ball head connecting piece.

4. The dimming mechanism according to claim 3, wherein the first direction is a left-right direction, and the second direction is an up-down direction; and
the ball-head ball center of the fixed ball head connecting piece, the ball-head ball center of the first adjustable ball head connecting piece, and a ball-head ball center of the second adjustable ball head connecting piece are placed in a same horizontal plane.

5. The dimming mechanism according to claim 4, wherein an included angle is formed between the sliding slot and the horizontal plane.

6. The dimming mechanism according to claim 1, wherein the fixed ball head connecting piece and the first adjustable ball head connecting piece are each a ball-head screw assembly, and the ball-head screw assembly comprises a ball-head screw and a spherical seat nut.

7. The dimming mechanism according to claim 1, wherein a sliding block is provided on the sliding slot, and one end of the second adjustable ball head connecting piece is slidably connected to the sliding slot through the sliding block.

8. The dimming mechanism according to claim 7, wherein the second adjustable ball head connecting piece is a ball-head screw assembly, and the ball-head screw assembly comprises a ball-head screw and a spherical seat nut, the sliding block comprises a sliding block base slidably connected with the sliding slot and a fixed part fixed on the sliding block base, and the fixed part is configured to be able to be movably connected with a ball head of the second adjustable ball head connecting piece; or
the sliding block is formed as a sliding rod connected to the spherical seat nut, and the sliding block is configured to be able to be slidably connected in the sliding slot.

9. The dimming mechanism according to claim 8, wherein the fixed part is formed in a ring-shaped structure, and a clamping slot is formed on the second adjustable ball head connecting piece, a spherical seat nut of the second adjustable ball head connecting piece is clamped on the fixed part through the clamping slot, and a ball-head ball center of the second adjustable ball head connecting piece is provided on an axial centerline of the ring-shaped structure; or
the fixed part is formed with a cylindrical surface groove, the second adjustable ball head connecting piece is provided as the ball-head screw, and the ball head of the second adjustable ball head connecting piece is installed and fitted in the cylindrical surface groove and configured to be slidable along the cylindrical surface groove.

10. The dimming mechanism according to claim 9, wherein an axial centerline of the cylindrical surface groove is perpendicular to a vertical plane passing a ball-head ball center of the fixed ball head connecting piece and the ball-head ball center of the second adjustable ball head connecting piece, wherein an inner surface of the cylindrical surface groove is formed by stretching, along the axial centerline, an intersection line of the ball head of the second adjustable ball head connecting piece and the vertical plane; or
the axial centerline of the cylindrical surface groove is formed as an arc line section, with the ball-head ball center of the fixed ball head connecting piece being as a circle center, and a connecting line between the ball-head ball center of the fixed ball head connecting piece and the ball-head ball center of the second adjustable ball head connecting piece being as a radius, wherein the inner surface of the cylindrical surface groove is formed by stretching, along the axial centerline, an intersection line of the ball head of the second adjustable ball head connecting piece and the vertical plane, and the vertical plane is the vertical plane passing the ball-head ball center of the fixed ball head connecting piece and the ball-head ball center of the second adjustable ball head connecting piece.

11. The dimming mechanism according to claim 9, wherein an elastic support structure is provided or integrally formed on an end face of one end of the sliding block base away from the fixed part, and the elastic support structure abuts against a bottom surface of the sliding slot and is configured to form an opposite acting force so that the sliding block base can be tightly attached to the sliding slot and can slide along the sliding slot.

12. The dimming mechanism according to claim 11, wherein the elastic support structure is embodied as a pair of arc-shaped elastic sheets, and the arc-shaped elastic sheets extend in a direction of the sliding slot.

13. A vehicle lamp module, comprising the dimming mechanism according claim 1 and the lighting unit,
wherein the lighting unit comprises a heat sinking part, and the sliding slot is integrally or detachably provided on the heat sinking part.

14. A vehicle lamp, comprising the vehicle lamp module according to claim 13.

15. The dimming mechanism according to claim 2, wherein the fixed ball head connecting piece and the first adjustable ball head connecting piece are each a ball-head screw assembly, and the ball-head screw assembly comprises a ball-head screw and a spherical seat nut.

16. The dimming mechanism according to claim 3, wherein the fixed ball head connecting piece and the first adjustable ball head connecting piece are each a ball-head screw assembly, and the ball-head screw assembly comprises a ball-head screw and a spherical seat nut.

17. The dimming mechanism according to claim 4, wherein the fixed ball head connecting piece and the first adjustable ball head connecting piece are each a ball-head screw assembly, and the ball-head screw assembly comprises a ball-head screw and a spherical seat nut.

18. The dimming mechanism according to claim 2, wherein a sliding block is provided on the sliding slot, and one end of the second adjustable ball head connecting piece is slidably connected to the sliding slot through the sliding block.

19. The dimming mechanism according to claim 3, wherein a sliding block is provided on the sliding slot, and one end of the second adjustable ball head connecting piece is slidably connected to the sliding slot through the sliding block.

20. The dimming mechanism according to claim 4, wherein a sliding block is provided on the sliding slot, and one end of the second adjustable ball head connecting piece is slidably connected to the sliding slot through the sliding block.

* * * * *